July 2, 1957 E. A. COX 2,798,042
SYSTEM OF SEWAGE TREATMENT AND PROCESS
Filed Sept. 11, 1953 5 Sheets-Sheet 1

INVENTOR,
Elza A. Cox
BY
ATTORNEYS

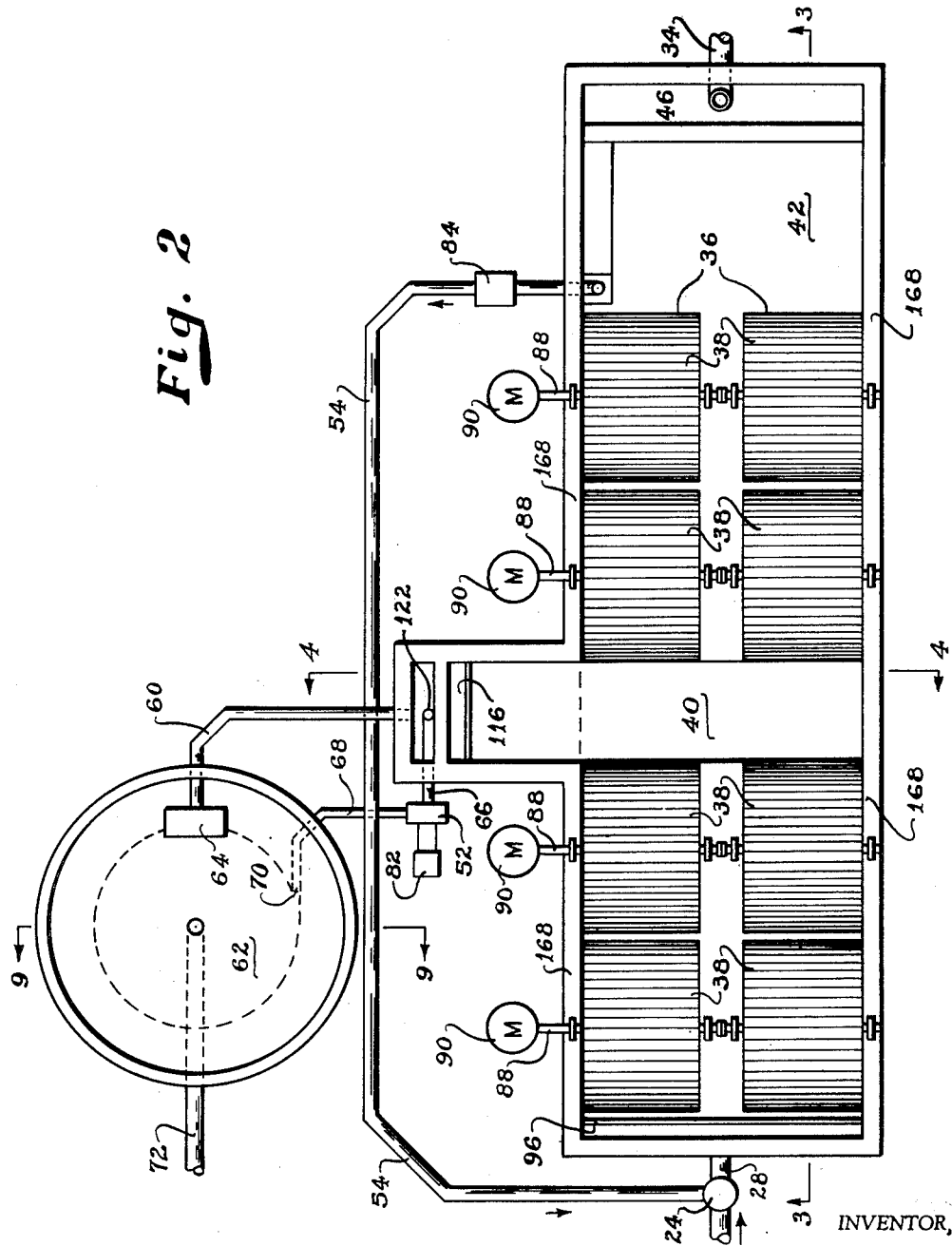

July 2, 1957 E. A. COX 2,798,042
SYSTEM OF SEWAGE TREATMENT AND PROCESS
Filed Sept. 11, 1953 5 Sheets-Sheet 3
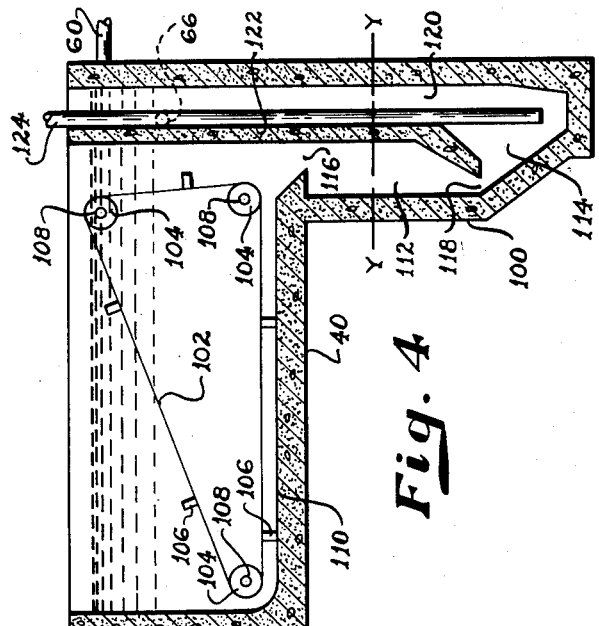
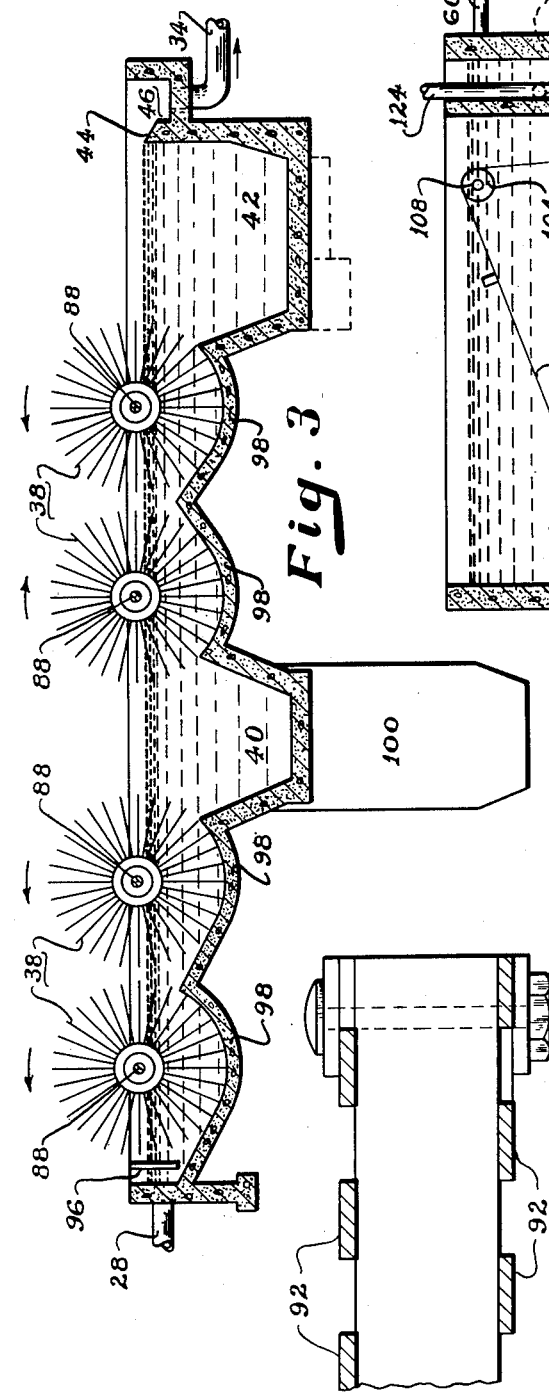
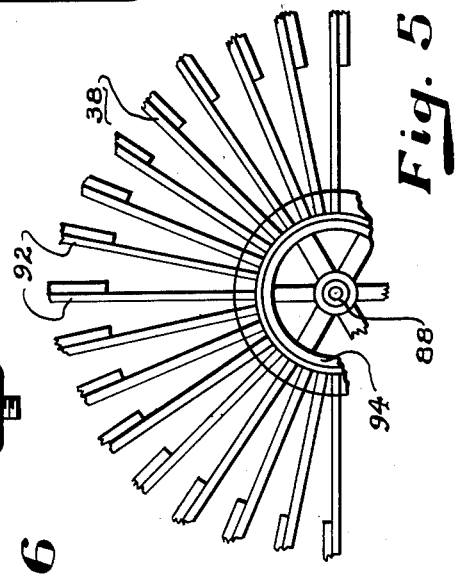
INVENTOR,
Elza A. Cox
BY *Mason, Mason & Sheridan*
ATTORNEYS July 2, 1957 E. A. COX 2,798,042
SYSTEM OF SEWAGE TREATMENT AND PROCESS
Filed Sept. 11, 1953 5 Sheets-Sheet 4
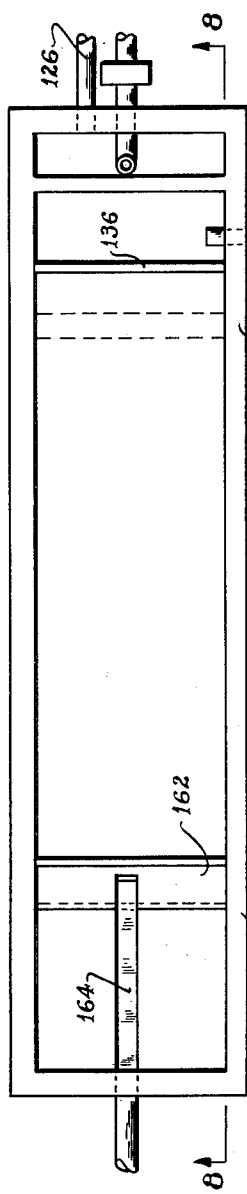
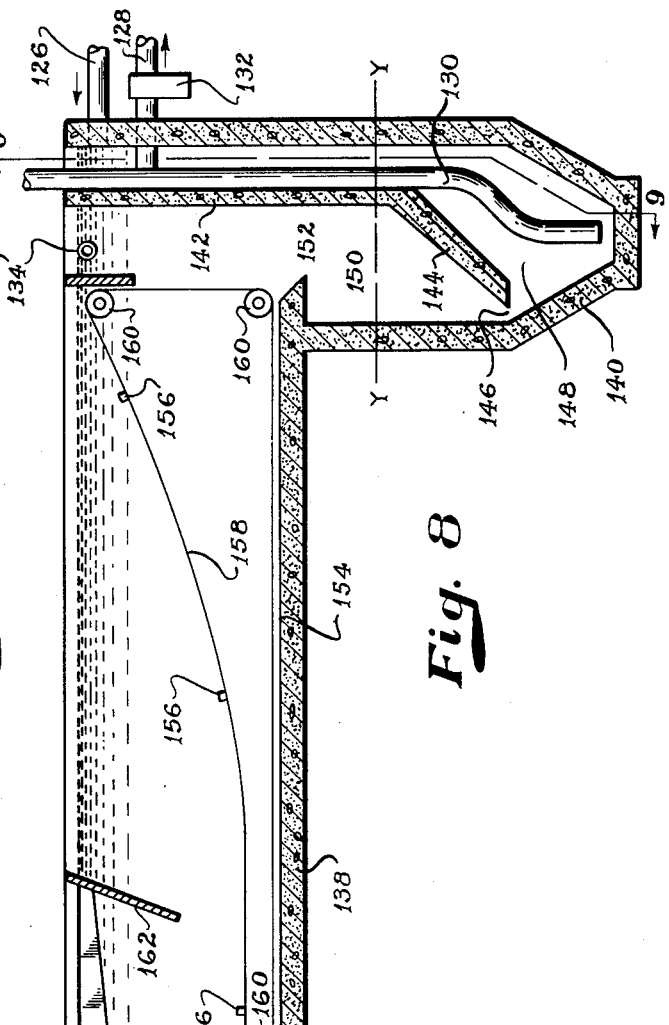
INVENTOR,
Elza A. Cox
BY Mason, Mason & Sheridan
ATTORNEYS.

July 2, 1957 E. A. COX 2,798,042
SYSTEM OF SEWAGE TREATMENT AND PROCESS
Filed Sept. 11, 1953 5 Sheets-Sheet 5
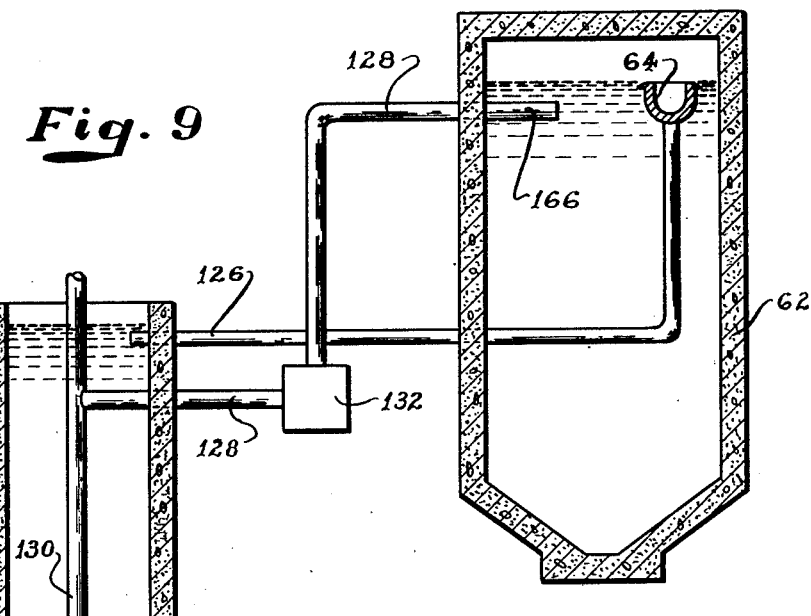
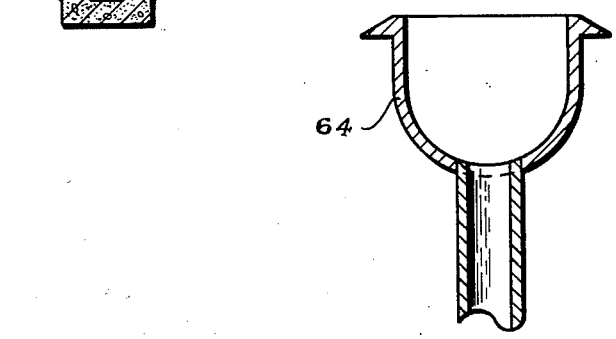
INVENTOR,
Elza A. Cox
BY Mason, Mason & Sheridan
ATTORNEYS United States Patent Office 2,798,042
Patented July 2, 1957

2,798,042

SYSTEM OF SEWAGE TREATMENT AND PROCESS

Elza A. Cox, Oak Ridge, Tenn., assignor, by mesne assignments, to Cox Engineering and Development Corporation, Oak Ridge, Tenn., a corporation of Tennessee Application September 11, 1953, Serial No. 379,515

15 Claims. (Cl. 210—15)

The present invention relates to a sewage disposal system and process which is particularly concerned with activated sludge treatment, although not limited thereto. Certain features of the present invention represent an improvement on the construction disclosed in my Patent No. 2,533,223, December 12, 1950. There are disclosed, however, herein, certain features of invention which are broadly novel, and that are not disclosed in Patent No. 2,533,223, and which form no part of the system disclosed in the said patent, as will be fully pointed out hereinafter in the specification and set forth in the claims.

An object of the invention is to speed up the purifying action of the aerators by a novel means and method of activating, filtration and coagulation of the sludge.

Another object is to provide an improved sludge receiving well means.

An additional object is to provide a novel construction of carrier bars and their location as regards the settling tank means.

A further object is the provision of an improved digestion tank having provision for distributing sludge solids over the surface of the digestion tank without using mixing devices and its location in the system.

An additional object is the provision of novel means for causing the circulating overflow liquid from the digestion tank, to act as a carrier for the sludge solids which settle in the sludge receiving well.

Another object is the arrangement of the sludge settling tanks with relation to the aerating 'brooms," and means for returning the sludge from the final settling tank to be mixed with the raw sewage coming into the system to "seed" the same.

An additional object is the combined construction and interaction of the sludge receiving well and digestion tank, without regard to the other elements of the system. This well and digestion tank may be used in other sewage systems. Moreover, the tank or the digestion tank can be used without regard to their combination in sewage systems, but better results have been obtained from their combination as hereinafter described.

Other objects will appear hereinafter throughout the specification.

In the drawings:

Figure 2 is an enlarged view of portions of the structure shown in Figure 1;

Figure 3 is a vertical sectional view on the line 3—3 of Figure 2;

Figure 4 is a vertical sectional view on the line 4—4 of Figure 2;

Figure 5 is a side elevation partly broken away of one of the aerating "brooms";

Figure 6 is a hub detail, partly broken away, of the "broom" of Figure 5;

Figure 7 is a top plan view of one of the primary sludge tanks;

Figure 8 is a vertical section on the line 8—8 of Figure 7;

Figure 9 is a vertical section through one end of a sludge tank on the line 9—9 of Figure 8 and digestion tank on the line 9—9 of Figure 2, showing piping connections and relative elevational relationship between the said tank and digestion tank; and Figure 10 is a vertical section of the overflow trough in the digestion tank.

Figure 1:
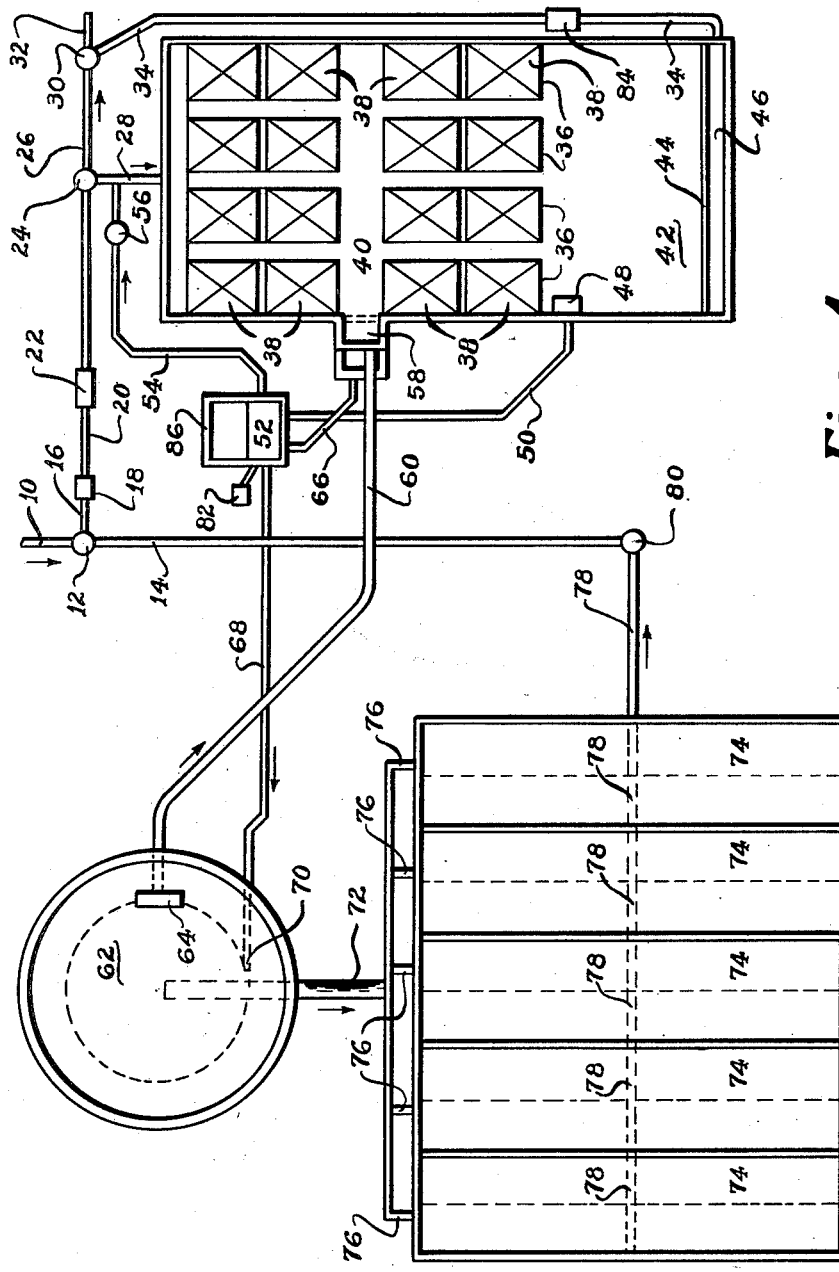
Figure 1 is a top plan diagrammatic view of a sewage plant constructed in accordance with the present invention.

In the following specification, numbered parts correspond to the parts noted in the drawings.

Referring to Sheet 1 of the drawings, which discloses a typical plant for sewage treatment for a community of between 5,000 and 10,000 inhabitants, a conduit 10 is provided for incoming sewage. This conduit leads to a combined manhole and valve 12, which has inlet conduits 14 and an exit conduit 16. Conduit 16 leads to a comminutor or bar screen 18, the exit end of which is connected by conduit 20 with the Parshall flume 22. The exit end of said flume connects with manhole 24 which is provided with conduits 26 and 28 and a valve control. Exit 26 leads to a combined manhole and valve 30. Conduit 32 leading from said manhole and valve 30 may pass to a river or other place of disposal, while incoming conduit 34 is connected to the final settling tank, preferably the effluent trough thereof hereinafter to be described. Influent conduit 28 forms the main inlet source for the sewage treatment structure and is equipped with suitable valve (not shown). This structure includes a plurality of alleys 36, four of such alleys being shown for purposes of illustration. Each alley consists of a plurality of aerating rotating "brooms" 38 hereinafter to be more fully described.

Extending transversely of the alleys is a primary settling tank with a collector, some of the rotating "brooms" being located on one side and others of said "brooms" being located on the opposite side of the primary settling tank 40. Located at the opposite end of the alleys 36 is the final settling tank 42. This tank comprises a well or basin located adjacent wells 98 and adapted to receive fluids therefrom. This tank is provided with a weir 44, such as shown in Figure 3, and effluent trough 46 which is connected to the conduit 34.

As seen in Figure 1, the final settling tank has a sump 48, and a sump return conduit 50 leads therefrom to a multiple unit pumping means indicated diagrammatically at 52. One portion of pumping means 52 receives sludge from pipe 66 and forces it into digesting means 62. Another portion of the pumping means receives sludge from pipe 50 and forces it into return pipe 54. Any desired portions of the pumping means may be operated cyclically by means of a timer controlled switch diagrammatically indicated at 82. The return conduit or pipe 54 connects to influent conduit 28. A suitable valve 56 may be provided in return conduit 54.

Primary settling tank 40 may be similar to the structure shown in Figures 4, 7, and 8. As seen in Figure 1, a sludge well 58 is provided, to which is connected conduit 60. Digestion tank 62 is provided with an overflow trough 64 shown in detail in Figure 10. Conduit 60 connects sludge well 58 to overflow weir trough 64.

The lower part of sludge well 58 is connected by conduit 66 to a pump at 52, whose outlet is connected to conduit 68. This latter conduit discharges by means of a jet 70 at or near the surface of the sludge within digestion tank 62.

The treated or "finished" sludge is discharged through conduit 72 to a plurality of sludge drying beds 74 by conduit means 76. Any number of drying beds may be used, five being considered a suitable number for the plant shown in Figure 1. These sludge drying beds may be provided with tile drains which connect to the outlet conduit 78 provided with manhole 80 that connects with exit conduit 14.

It will be understood that the pumping means 52 include a sludge pump located in conduit 68. This pump may be provided with an electrical timer indicated at 82. Said pumping means 52 also include a sludge return pump for forcing fluids through return conduit 54. This sludge may be mixed with and form part of, the influent which enters through influent conduit 28.

The construction shown in Figures 2 and 3 is similar to that shown in Figure 1, except that only two alleys have been provided, and sludge drying beds 74, when the pipe connects to and from said beds, have been omitted in order to show certain details.

Referring to Figures 2 and 3, as well as Figures 5 and 6, pairs of aerating "brooms" 38 are mounted on shafts 88 which may be driven by any suitable driving means, such as the motors 90. These "brooms" consist of splines 92 of wood or other suitable material mounted on carrier bars in hub 94, as seen in Figures 5 and 6.

The rotating "brooms" 38 are preferably caused to rotate in the directions indicated by the arrows in Figure 3. Influent pipe 28 causes raw sewage, or raw sewage mixed with sludge from sludge return conduit 54 to engage baffle 96 as seen in Figure 3, and to be dispersed by baffle 96 (Fig. 3) and enter the series of wells 98.

Primary settling tank 40 is provided with sludge well 100 (as shown in Fig. 4). The fluid level in each of the series of wells 98 may be at a level of about two to four inches below shaft 88 as controlled by weir 44 in final settling tank 42. This tank is provided with traveling belt 102 which moves over pulleys 104 and is provided with spaced scrapers 106. Pulleys 104 are mounted on shafts 108, one or more of which is driven by a suitable source of power such as an electric motor (not shown). Scrapers 106 continually scrape the surface 110 toward chamber 112. This chamber is located above chamber 114. Located above chamber 112 is slot 116 and located between chambers 112 and 114 is slot 118. These chambers are separated from chamber 120 by a vertical partition 122. Located in chamber 120 is stack 124. Chamber 120 vents gas from chamber 114. Conduit 66 enters the chamber below the normal liquid level and is preferably, as shown, connected to stack 124.

Referring to Figures 2 and 4, the action of the circulating overflow liquid passing through pipe 60 from digestion tank 62, acts as a carrier for the sludge solids which settle into chamber 114 and the lower part of chamber 112 or 148 in Fig. 8 below the line Y—Y of Figures 4 and 8.

The action of the sludge blanket and the diluting effect in the upper part of chamber 112 sharply limits the amount of septic liquid that ultimately passes back through slot 116. This practically eliminates its toxic effect. This return is at a substantially uniform rate, rather than at long intervals of heavy flow of full strength toxic liquid as is the present practice.

Referring to the digestion tank 62 shown in Figures 1 and 2, it has been found that the jet injector 70 distributes the sludge solids over the entire tank without the necessity of providing mixing devices.

The construction and operation of the overflow weir trough 64 within the digestion tank 62 skims the surface of the digestion tank contents and prevents the formation of objectionable scum, without necessitating the use of scumbreakers.

It will be noted further that the sludge solids are transferred automatically to the digestion tank by means of the time controlled pump 52 in Figure 2.

It will be further observed that the primary settling tank 40 and digestion tank 62 complement each other. For instance, the liquid as it circulates in the digestion tank, overflows into the overflow weir trough, such liquid acting as a carrier for the sludge solids which settle in chamber 114 of the primary settling tank. A slightly different form of sludge tank is shown in Figures 7 and 8. This structure is practically identical with that shown in Figs. 1 and 4 with only such modifications as are necessary to receive, combine, and concentrate the sludge from several units as shown in Fig. 1. The sludge collectors, sludge wells, pumps, sludge injection, and overflow return are practically identical in each. In this form, fluid is led into the tank via pipe 134 which may lead from a plurality of units such as shown in Fig. 1 where great volume of sewage requires several such units. In this case sludge wells as shown in Fig. 4 may be reduced in size, and chamber 114 becomes in these cases merely a pump sump. Sludge from these several sumps is pumped through a common line 134 to the concentrator or tank 138. Conduit 128 which taps into vent sludge pipe 130, the numeral 132, (equivalent to 52 in Fig. 1), indicating the sludge pump that leads to the digestion tank 62. The numeral 134 indicates the sludge inlet and 136, a baffle in the sludge concentrator or tank 138. The well 140 is provided with a partition 142 having a lower extension 144. This forms a lower slot 146 located above chamber 148 and below chamber 150. Above chamber 150 is slot 152. Sludge concentrator or tank 138 is provided with a floor 154 over which the scrapers 156 move. These scrapers are mounted on belt 158 trained over pulleys 160. One or more of these pulleys is driven from a suitable source of power, such as a motor, (not shown).

Located toward the left side of the settling tank 138 is the baffle 162, and extending to this baffle is a skimming trough 164 leading back to the main incoming sewer. Figure 9 shows the vertical section through the well of Figures 7 and 8 and a vertical section through the digestion tank with connections thereto.

Conduit 128 of Figure 9 corresponds to conduit 68 of Figure 2, and it will be noted that the end of pipe 128 is provided with an injector 166 corresponding to injector 70 of Figures 1 and 2.

A sub-combination of the plant consists of the primary aeration bay, the final aeration bay, and the primary and secondary settling tanks, such as shown in Figures 1 to 4 of the drawings.

In Figure 1 is shown sixteen aerating units or "brooms," while Figure 2 shows one-half this number of aerating units, Figure 1 showing four alleys and Figure 2 showing these "brooms" in two alleys. Any number of aerating units or "brooms" may be used in each alley and the number of alleys may be increased or decreased to suit the amount of sewage to be treated and the degree of purification required. The aeration units 38 are closely hedged-in by side walls 168, and the primary and secondary bays are separated by the primary settling tank 40, which is comparatively small, in order to prevent much settling out of activated sludge floc. The secondary aeration units have attached to their exit ends, the final settling tank 42.

When only primary treatment is required, the aeration units in the primary aeration bay; i. e., those units which empty into the primary settling tank and which are located to the left of said tank 40 in Figure 2, need be used. In this case, a larger primary settling tank will be used in order to give a detention period suitable for the purification requirement, which usually requires about two hours.

The sewage, either raw or settled sewage from a preceding primary treatment, is introduced directly upon the first "broom," or "brooms" depending upon the number of aeration units mounted on leftmost shaft 88 as seen in Figure 2. This aeration unit or units resembles a giant street sweeper with splines of wood or other suitable material, constructed in accordance with Figures 3, 5, and 6 and driven by any suitable modified power, such as the motors shown in Figure 2. In this construction, the carrier bars are mounted on wheels instead of the endless chains shown in my patent above referred to. The device of the instant invention is better suited for small installations.

The several aeration units are immersed in the flowing sewage to approximately the length of the splines; although, such immersion may occur to within about two to four inches or less of the shafts 88, depending upon conditions to be that which are encountered, and the speed of rotation of the aeration units. As these aeration units or "brooms" rotate, each of the hundreds of splines is alternately immersed in the sewage and exposed to the atmosphere. About one minute for each exposure has been found satisfactory; although this timing is not critical. After the "brooms" have operated for a short time, the surface of the splines becomes coated with a bacterial jelly produced by the action of aerobic bacteria upon the sewage. The "brooms" during rotation, supply an abundance of oxygen, which is necessary for bacterial growth. The oxygen is supplied in three different ways: First, oxygen is absorbed in the water film on the surface of the splines as they pass through the air. Second, a heavy drippage from the splines occurs as they emerge from the sewage, and this drippage carries oxygen to the flowing mass. Third, the surface of the sewage is broken many times every second of operation by the splines as they submerge within the flowing mass and emerge on the opposite side, thus rolling a new surface of the flowing mass constantly to the atmosphere.

The organic matter in the sewage adheres readily to the bacterial jelly on the splines, and is literally swept from the sewage, together with the grease and fine floating material. This material is incorporated into the jelly and is swept into the sumps with the jelly when it is shed from the splines. To facilitate the sweeping of the sludge to the sumps, at least one squeegee strip is attached to all the tips of any row of splines (that pass very closely to the curved floor), of each wheel 98, thereby allowing no sediment to remain. This procedure eliminates the scum and grease nuisance which is encountered in the operation of many sewage plants. This structure also eliminates the necessity for hand labor to control and eliminate the scum and grease which accumulate in sewage plants.

In addition to the solids which adhere to the jelly on the splines, there is an activated sludge action which is very similar to that encountered in conventional activated sludge systems. In the present construction, however, oxygen is supplied, as explained above, by the continuous immersion of the splines. Many conventional sewage systems used instead, compressed air which does not accomplish the purpose accomplished by the present invention; that is, the complete aeration and the supplying of a maximum amount of oxygen to the flowing mass. The surface of fine particles of solids in the sewage is coated over, such as the splines, with bacterial jelly. These almost microscopic free-floating masses, called floc, are extremely small and light when first formed. As they are rolled about in the flowing mass, they gain in weight and size, and many of them adhere to the brooms. This adherence builds up over a period of time, and becomes very heavy. Finally, its own weight becomes such that (probably assisted by a ripening process), it slips from the splines in batches and is swept to the primary settling tank. Here due to its weight, it settles very rapidly and but little of it passes to the secondary brooms. The free-floating activated sludge floc, however, does not settle readily, and only the heavier portions settle out in the primary settling tank.

The flowing sewage carrying the lighter elements of floating activated sludge floc passes to the secondary aeration bay where the process is repeated. The sludge from the secondary aeration is largely activated sludge floc, although there is a considerable amount of bacterial jelly shed from the splines. This jelly, which is a modified form of activated sludge, and the floc are then settled out in the final tank and collected by a standard sludge collector to a single sump. From this sump this settled material, or sludge, is returned by a pump, preferably continuously or at very short intervals, to the inlet to the primary aeration bay, thus completing a cycle and adding activated sludge to the incoming sewage. Unlike the conventional activated sludge system, all of the final sludge may be returned to seed the plant. This can be done because the sludge ordinarily wasted in the conventional system is either incorporated on the splines or becomes heavy enough to be settled out in the primary settling tank.

The sludge settling in the primary settling tank is swept directly to the primary sludge receiving well 100 whereas in conventional systems this transfer of sludge to the sludge receiving well is accomplished by pumps or hand operated valve mechanisms.

Thus, it will be seen that there are three distinct functions performed by the "brooms"; first, the activated sludge action both on the surface of the splines and on the floc; second, the filtration action similar to that in trickling filters (except that the filration media are moving rather than fixed); and third, the coagulating action of the submerged biological filters. The effect of these actions is to speed up the process, thus shortening the retention time and bringing about a sharp reduction in cost.

The second important structural part of the system is the primary sludge receiving well 40. Together with the primary settling well 100 it may be considered as a modified type of Imhoff tank, where the primary tank is the flow chamber. In very small tanks, the sludge can settle to the slot 116 by gravity. However, in larger tanks the sludge is brought to the slot by a sludge collector. Instead of a single sludge storage chamber beneath this slot 116, as in the Imhoff tank, there are two chambers, shown as 112 and 114. Chamber 114 communicates with chamber 112 by a slot 118. Chamber 112, which is a dilution chamber, for best results, should be rather deep. Chamber 114 need not be so large but only large enough to accommodate the sludge being produced between the times of pumping, which will usually be from one to six hours. This sludge well 100 is connected with the digestion tank 62, and the volume of chamber 112 is designed to be about double the surcharge that accumulates above the lip of the overflow weir 64 in the digestion tank, as later described.

The sludge from this well is pumped to the digestion tank, being injected through jet 70 formed by a nozzle constriction at the end of the injection pipe near the surface of the water in the digestion tank. The action of the well is as follows. The sludge is collected by the sludge collectors and deposited through the slot 116 into the chamber 112 where it settles down in the chamber 114. The chamber 114 is ordinarily filled with septic return liquid from the digesting tank, which at the end of the pumping cycle also fills the bottom part of the chamber 112 approximately up to the line Y—Y. This filling of the bottom of the chamber 112 is due to the run-back of the surcharge in the digestion tank which lies above the lip of the overflow trough 64 when the pump stops. Above the line Y—Y is a constant blanket of fairly heavy sludge which largely prevents the mixing of the septic liquid below the line Y—Y with the fresh sludge and its accompanying liquid. With this condition at the end of the pumping cycle, the sludge slowly filters down through the septic liquid. This filtering period may be from one to six hours depending on the sewage treated and many other factors controlled by the operator. In this process, but little fresh liquid passes down into the septic liquid, and but little of the septic liquid passes up through the sludge blanket at any given time. The slow interchange of these liquids is brought about by displacement caused by the settling of the solids. The displaced septic liquid from the digestion tank, passing slowly up through the sludge blanket, is greatly diluted by the fresh liquid of the downcoming sludge in chamber 112. Since the system is closed, it must pass back out through the slot 116 into the flowing sewage only a little at a time and in a highly diluted form. Its toxic effect on the system is rendered negligible.

At the end of the settling cycle, the pump is started and the sludge, carried by the septic liquid, is injected into the digester. For best results, this pump should be controlled by a time switch, as shown at 82 in Figure 2. Since the back-flow over the weir, or overflow trough 64, in the digestion tank must await the build-up of the surcharge in the tank, chamber 114 is at first rapidly exhausted, and the bottom contents of chamber 112 up to about the line Y—Y is drawn in to replace it. Soon the back-flow begins to feed the pump, and an equilibrium is established between the pump capacity and the returning overflow at which time there will be no further flow from the chamber 112, regardless of how long the pump runs, since its full capacity will be fed by the overflow and the septic liquid from the digestion tank will continue to circulate as long as the pump runs. This circulating run should be long enough to draw the scum-forming elements which originate in the digestion tank through the system and eject them back through the jet 70, thus beating out the entrained gas and settling them in the digestion tank as any other sludge. It will be noted that the sludge is carried into the tank by the septic liquid originating there, and that very little fresh liquid ever reaches chamber 114. This is an important difference between the present system and conventional systems where the carrier for the solids is fresh sewer liquid. In the operation of any digestion tank, it is of prime importance to keep the volume of new liquid applied to the tank as low as possible. An excess of fresh liquid dilutes the tank contents and increases the flow of septic liquid which must be discharged back into the system, often with ill effects. The instant apparatus and process practically eliminates the toxic effect of the septic return liquid. It comes into the system in smaller volume, in continuous application, and in diluted form.

The third important part of the system and method comprises the special equipment used in the digestion tank. The tank itself need not differ from standard tanks now in use, except in two structural features, namely, the method and apparatus for injecting the sludge, and the method and apparatus for handling the overflow.

In the existing practice, the sludge is usually pumped from a sludge concentration tank where it has been concentrated to about 5% solids. It is deposited into one side of the digestion tank and then is mixed with the contents of the tank by a system of rotating paddles, distributing it over the whole area of the tank section. As the sludge is pumped in, the excess liquid lying on top of the mass, and containing only a small solid content, is allowed to overflow so as to maintain a fairly constant level. This overflow is usually at the opposite side of the tank from the inlet. The overflow liquid is usually led either to an aeration tank or directly into the incoming sewage feeding the plant. In all cases, its ultimate destination is the raw sewer line, where its toxic properties are highly objectionable, especially if there is to be secondary treatment of a biochemical nature.

In the apparatus and method herein described and claimed, the sludge is injected through a high velocity jet just beneath the surface of the liquid. It strikes the liquid substantially tangentially, of a circle approximately one-third the diameter of the digester in from the periphery thereof, and causes a rapid circulation, the whole surface of the tank being set in motion. Eddy currents are set up by the friction, and the incoming sludge is distributed uniformly over the entire surface of the tank where it immediately begins to settle. As soon as the pump stops, this rotation slowly ceases, and the sludge which has been carried by it settles in a thin film which is quickly seeded by the bacteria in the tank, thus promoting rapid digestion. No moving parts are used in the tank. This method of injection renders unnecessary any mixing and scum-breaking devices.

The overflow of the digestion tank is through an overflow trough, very similar to those used in the backwash of a rapid sand filter. It is made rather long in order to provide a good collection of the outgoing liquid. Its purpose is to skim the surfaces of the tank of all incipient scum-forming particles. These particles pass down through the system and are again injected into the tank by the high velocity jet, beating the entrained gas out of them and causing them to sink as sludge. The length of the overflow trough should be such that when equilibrium is established between the pump and the overflow, the surface of the tank liquid will be about ½" to ¾" above the lip of the trough, sufficient to cause all floating particles to pass over into the trough without lodging on the edge. To promote this, the lip of the trough is designed with a sloping approach, as shown in the drawings. The sloping approach allows solids to pass over with greater facility. This depth over the weir, or surcharge of the tank, has a volume equal to the area of the tank surface multiplied by the depth of the surcharge. Knowing the diameter of the tank to be used and the surcharge height established by a proper relation between the pump and the length of the trough, the volume which will run back after the pump stops can be calculated. This runback volume should be about one-half the volume of the chamber 112 and said chamber should be designed accordingly. The pump run, as controlled by timer 82, should be long enough to draw all the scum-forming particles on the surface of the tank in close proximity to the overflow trough 64, allowing the scum-forming elements to escape. The motor of the sludge pump feeding this tank should be controlled by the adjustable time switch 82, so that the operator can readily select the length of the pumping cycles and the time of each individual pump run, since different sewages will have different requirements in this respect.

Some variations of these arrangements may be necessary to suit special requirements, or for use as an improvement in existing plants, particularly with respect to the method and apparatus for introducing sludge to the digestion tank and the method and means for handling the septic liquid from the digestion tank.

By using the primary settling tank 40 in connection with the sludge well 100, but without the aerating units or bays, this combination with the digestion tank can be very useful in any existing sewer system where sludge is pumped to a central well from different sources. In such a case, the primary tank would become like an Imhoff tank, except that the sludge would be drawn to the sludge well by collectors and the thin sludge from different sources pumped into this tank and resettled as if it were raw sewage. The effluent from this tank, properly baffled, is then discharged back to the incoming sewage. It would, in this case, probably carry a small amount of solids, but since the sludge is usually fresh, it would not overload the incoming sewage. This application of the sludge well is shown in Figures 7 and 8 of the accompanying drawings.

Although the above construction, which employs the second and third parts of the system without the first, is quite feasible, the second and third parts are inseparably connected to each other in operation. These parts, namely, the settling tank with its sludge well and the digestion tank shown and described herein, must be used together. They constitute the only system which will adequately serve the first, i. e. the aeration and settlement part of the means and process.

The structure shown in Figures 7 and 8 is a somewhat modified form of primary sludge settling tank and sludge receiving well and is principally for use in large installations. This structure is quite similar to the primary tank and sludge receiving well shown in Figure 4, which structure is located between the pairs of aerating bays, such as disclosed in Figures 1 and 3. While this form of primary sludge settling tank may be substituted for tank 40 in Figure 1, in large installations it may preferable to form it as a central unit to which sludge from several aerating units may be led to it. The sludge is then resettled in the central unit and pumped from the chamber 150 to the digestion tank, the overflow return from the digestion tank coming back to the central unit, i. e. the structure shown in Figures 7 and 8.

In summary, it may be stated that the system disclosed and claimed herein is exceedingly simple and practically automatic. The separation of the solids from the liquid, which is allowed to pass to the outflow in a comparatively pure state, is contained in a single structure consisting of a primary aeration bay, a primary settling tank, a secondary aeration bay, and a final settling tank. The sludge settling in the primary settling tank is automatically deposited in the sludge receiving well by the sludge collector, while the sludge settling in the final settling tank is pumped back to the primary aeration bay to seed it with activated sludge floc. This is an important feature, since in existing systems the sludge well is usually some distance from the settling tank, and the sludge is conveyed to its through pipes by means of a sludge pump or by hand operated valves if gravity can be utilized. This involves a considerable cost in construction, maintenance and labor, which is avoided by the present means and method.

The sludge receiving well shown in Figures 4, 7, 8 and 9 combined with the jet injector and overflow trough of the digestion tank is completely new in sewage treatment. Here the septic liquid from the digestion tank is utilized as a carrier of the sludge solids, together with a small amount of fresh sewer liquid which settles to the bottom of the chamber 112 and the chamber 114 of Figure 4, or 148 of Figure 8. No over-pumping of sludge can occur, since the septic liquid simply circulates, picking up the sludge solids on the way as long as any remain in the chamber 114 of Figure 4, or 148 of Figure 8. The flow through the upper slot ceases when the pump capacity and the overflow stabilizes, regardless of the length of the pump run. Further, there is great dilution of the septic liquid passing back into the system, accomplished by the sludge blanket in the upper part of the chamber 112 which limits the amount of liquid passing back through the upper slot of these chambers.

In the digestion tank, the jet injector produces circular and eddy currents, distributing the incoming sludge solids evenly over the whole area of the tank surface where they settle down in a thin film. This action makes a stirring mechanism unnecessary. The overflow trough skims the incipiently forming scum from the surface of the tank. It then passes down and back through the jet where the entrained gas is beaten out, and it sinks as sludge. No scum can form and no scum-breaker is needed.

The above description and drawings disclose several embodiments of the invention, as specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. An apparatus for sewage treatment comprising in combination, a plurality of first aerating bays, primary settling tank means following and in fluid communication with said first aerating bays, a plurality of second aerating bays in fluid communication with said first bays, a final settling tank means adjacent the exit end of said second aerating bays, influent conduit means opening into said first bays, a mechanical aerating means rotatably mounted on a horizontally disposed axis in each of said bays, a sludge receiving well in fluid communication with said primary settling tank, a digestion tank, a second conduit means for conveying sludge liquid from said well to said digestion tank, a third conduit means for conveying sludge liquid from said digestion tank back to said well, and means for injecting fluid from said sludge receiving well through said second conduit means into said digestion tank and tangentially against its inner surface, said sludge receiving well having an upper and a lower chamber in fluid communication, slot means between said chambers, said aerating means each being substantially cylindrical in form and having numerous radially extending splines on its outer surface, said final settling tank having an outlet, a fourth conduit means for conveying sludge liquid back to said first aerating bays, and the axes of said aerating means being disposed in a plane in proximity to the plane of said outlet so that approximately one half of said splines will be immersed in sludge liquid at all times during the sewage treatment.

2. An apparatus for sewage treatment as defined in claim 1, and additional slot means between said upper chamber and said primary settling tank.

3. An apparaus for sewage treatment comprising in combination, a plurality of aerating bays including rotatable aerating means in each bay, said aerating bays being in fluid communication with each other, settling tank means adjacent one of said bays, influent conduit means opening into another of said bays, means for rotating said aerating means on substantially horizontally disposed axes, said aerating means each being substantially cylindrical in form and projecting above its bay a distance substantially equal to its radius, a sludge receiving well in fluid communication with said settling tank, a digestion tank, said digestion tank having a concave inner surface, a second conduit means for conveying sludge liquid from said well to said digestion tank, means for injecting fluid from said sludge well through said second conduit means into said digestion tank, said means for injecting fluid discharging directly and tangentially onto said concave surface, effluent conduit means connecting the upper portion of said digestion tank to said sludge well for conveying sludge liquid from said digestion tank back to said well, said sludge well having an upper and a lower chamber, slot means between said chambers, and additional slot means between said upper chamber and said settling tank.

4. An apparatus for sewage treatment as defined in claim 3, and a partition in said well, said partition having a vertical portion and an inclined portion, said inclined portion and a wall of said well forming said lower chamber and said first mentioned slot means.

5. An apparatus for sewage treatment as defined in claim 4, and a time-controlled pump means operatively connected to said fluid injecting means to force fluid from said well to said injecting means.

6. An apparatus for treating sewage comprising a settling tank, a sludge receiving well adjacent to and in fluid communication with said settling tank for receiving sludge from said settling tank, a digestion tank, an overflow trough in the upper portion of said digestion tank, conduit means connecting said trough to said sludge receiving well for conducting overflow from said digestion tank to said settling tank, a concave surface in said digestion tank, means for injecting fluid directly and tangentially against said concave surface, conduit means for conveying fluid from said well to said injecting means, time-controlled pump means for forcing sludge from said well to said injecting means, said well having a pair of chambers one being located above the other, and a vertical partition in said well separating one of said chambers from both of said conduit means, and said injecting means being disposed in substantially the same horizontal plane as said overflow trough so as to impart a rotary motion to that part of the sludge liquid in the upper portion of said digestion tank.

7. An apparatus for treating sewage as defined in claim 6, and a slot between one of said chambers and said settling tank, and a second slot between said chambers to provide fluid communication between said chambers and said settling tank.

8. An apparatus for treating sewage as defined in claim 6, wherein said vertically arranged partition terminates short of the bottom of said well.

9. An apparatus for treating sewage as defined in claim 8, wherein said partition is inclined laterally at its lower extremity toward the wall of said well to provide said first mentioned slot.

10. An apparatus for treating sewage as defined in claim 8, wherein the bottom wall of said settling tank is extended beyond the adjacent side wall of said well toward said partition and over said second chamber to form said second slot.

11. An apparatus for treating sewage comprising a reservoir having a settling tank, a sludge receiving well located adjacent to and in fluid communication with said settling tank, a digestion tank, an overflow trough in said digestion tank, conduit means connecting said trough to said sludge receiving well for conveying sludge liquid from said digestion tank to said well, injection means in said digestion tank, additional conduit means connecting said injection means to said well for conveying sludge liquid from said well to said injection means, said sludge receiving well having an upper and a lower chamber, slot means between said chambers, said digestion tank having a concave inner surface and said injection means discharging directly onto and tangentially to said concave surface, said overflow trough and said injection means being disposed in substantially the same horizontal plane in said digestion tank, the location of said injection means at or near the level of said sludge causing the upper portion only of said sludge to be rotated in said digestion tank, means to force sludge from said well to said injection means, said lower chamber serving as a storage receptacle for the overflow from said digestion tank, and said slot means serving to prevent the more viscous portions of the sludge from passing to said lower chamber from said upper chamber.

12. An apparatus for treating sewage comprising a substantially horizontally disposed reservoir open at its top, a first set of aerating bays in said reservoir, said bays having a sewage inlet, a second set of aerating bays in said reservoir and spaced from said first set, a primary settling tank between said sets of bays, a final settling tank on the side of said second set of bays remote from said primary settling tank, a sludge receiving well in fluid communication with said primary settling tank, a rotatable aerating means in each of said bays, an outlet in the wall of said reservoir adjacent said final settling tank to control the level of sewage in said reservoir, said aerating means each being rotatable on a horizontal axis arranged in substantially the same horizontal plane as said outlet so that a substantial portion of each of said aerating means projects above the level of the sewage in said reservoir, each of said aerating means being of cylindrical brush form and comprising a plurality of radially disposed splines, and conduit means to convey sludge liquid from said final settling tank back to said first set of aerating bays.

13. An apparatus for treating sewage as defined in claim 12, wherein the bottom of said reservoir is provided with concave portions in its bottom wall through which the lower portions of said aerating means pass as they turn on their axes, said splines being in substantial engagement with said concave portions when in their lower positions so as to sweep the lower surfaces of said concave portions.

14. An apparatus for treating sewage as defined in claim 13, wherein each of said concave portions is curved in an arc having a radius substantially equal to the radius of said aerating means so as to conform substantially to the curvature of said aerating means.

15. A method of treating sewage consisting of the following steps: forcing the influent into a first series of shallow wells while subjecting the same to the action of a set of rotating brushes mounted in said wells and projecting above the level of the sewage in said wells, then forcing the influent into a primary settling tank and in turn to a sludge well, withdrawing sludge from said sludge well and injecting the same at or just beneath the surface of liquid in a digestion tank, returning liquid from said digestion tank to said sludge well and primary settling tank, subjecting the returned liquid to the action of a second set of rotating brushes similar to the first set and mounted in a second series of shallow wells, then forcing the liquid into a secondary settling tank, and regulating the return of the liquid from said secondary settling tank back to said first series of wells and mixing it with influent.

References Cited in the file of this patent

UNITED STATES PATENTS

| | | |
|---|---|---|
| 1,399,561 | Imhoff et al. | Dec. 6, 1921 |
| 1,820,977 | Imhoff | Sept. 1, 1931 |
| 1,919,689 | Elrod | July 25, 1933 |
| 1,985,854 | Downes | Dec. 25, 1934 |
| 2,326,303 | Moerk et al. | Aug. 10, 1943 |
| 2,331,031 | Kurtz | Oct. 5, 1943 |
| 2,348,125 | Green | May 2, 1944 |
| 2,458,163 | Hays | Jan. 4, 1949 |
| 2,533,223 | Cox | Dec. 12, 1950 |